Nov. 8, 1932.   B. VAN DER POL   1,886,990
RECEIVING SYSTEM
Filed Jan. 15, 1925
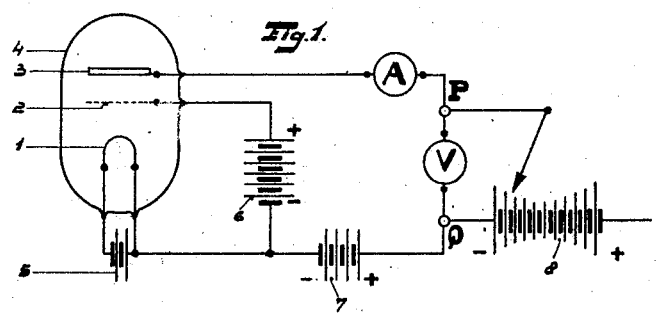
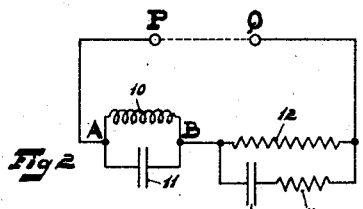
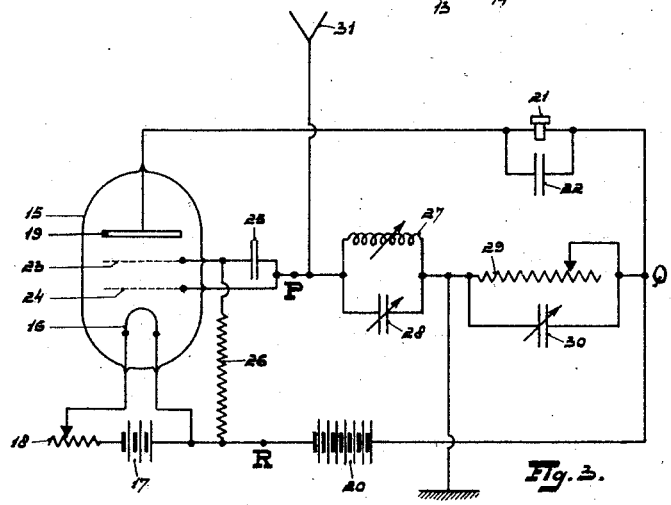
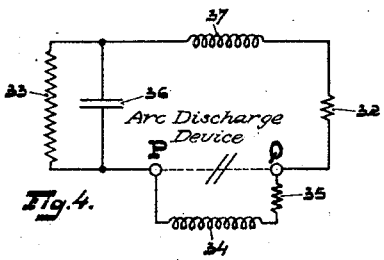
Inventor
Balthasar van der Pol
By: E. T. & J. F. Brandenburg
Attorneys Patented Nov. 8, 1932

1,886,999

UNITED STATES PATENT OFFICE

BALTHASAR VAN DER POL, OF EINDHOVEN, THE NETHERLANDS, ASSIGNOR TO N. V. PHILIPS' GLOEILAMPENFABRIEKEN, OF EINDHOVEN, THE NETHERLANDS

RECEIVING SYSTEM

Application filed January 15, 1925, Serial No. 2,512, and in the Netherlands February 29, 1924.

This invention relates to a system for receiving wireless signals which may serve both for telephony and for telegraphy reception.

There are already known systems adapted for the reception of wireless signals and operating with a negative resistance characteristic.

A system having a negative resistance characteristic is hereinafter to be understood to mean a system in which a circuit is so constituted that, at least for a definite region, the current decreases when the potential in the circuit increases and vice-versa or in other words: a circuit for which $$\frac{dV}{di} < 0.$$

In such a circuit with negative resistance the value of this resistance can be measured by mounting a variable potential in series with that part of the circuit in which the negative resistance occurs and by measuring the current intensities corresponding to different voltages.

An example of a system having a negative resistance characteristic is a triode in the so-called "dynatron" circuit arrangement. Such a system is diagrammatically illustrated in Figure 1 of the accompanying drawing.

In Figure 1, a cathode 1, a grid 2, and an anode 3 are arranged within a hermetically closed vessel 4, which for example may be highly evacuated in some known manner.

The grid potential is indicated by a battery 6 and the anode potential is fixed by series-connected batteries 7 and 8. By a proper choice of the potentials of the batteries the primary electrons on reaching the anode liberate a number of secondary electrons from the surface of the anode electrode, which secondary electrons are drawn towards the grid if the grid potential is higher than that of the anode. If the voltage at the battery 8 is raised, the number of liberated secondary electrons increases so that the current in the anode circuit decreases.

In the anode circuit, for example, between the points P and Q, there occurs, consequently, a negative resistance, the characteristic of which can be found by giving different values to the potential of the battery 8 and by measuring every change in the current with a change of voltage with the aid of a voltmeter V and an ammeter A.

Other examples of systems having a negative resistance characteristic are:

1. Devices in which an arc discharge occurs.
2. The so-called Turner's Kallirotron (described in Radio Review I page 317 foll.).
3. The negatron (described in Radio Review II page 598 foll.).
4. The devices described in the British Patent paper 172,320.
5. A system with a discharge tube comprising an incandescent cathode, an anode, a controlling grid, and an auxiliary grid which is arranged between the cathode and the controlling grid and has a positive potential relatively to the cathode, the two grids being so connected that their potential-fluctuations are equal.

In order to be suitable for receiving oscillations of high frequency, all these devices must give rise to a rectifying effect, so that the oscillations of low frequency with which the carrying wave of high frequency is modulated or which are obtained by interference, can be made audible in a telephone or similar apparatus.

If the systems operate with discharge tubes provided with a controlling grid, the detector action may be obtained in some known manner by means of a grid condenser with leakage resistance, while in the case of arc discharges the rectifying effect can be obtained by taking care that only one of the two electrodes is heated to incandescence or that in general the discharge is asymmetric.

The invention has for its object to provide a circuit arrangement with negative resistance characteristic and with rectifying effect in such a manner that if an electromotive force, induced by the received signal, acts on the said arrangement, the oscillations of very low frequency as well as those of very high frequency are amplified in a larger measure than the amplification in the circuit-arrangements which have been used hitherto.

According to the invention there is mounted in series with that portion of the circuit in which the negative resistance occurs, a separate circuit which closes the said circuit and which has an impedance which is in general a function of the frequency, but which is so arranged that for one definite high frequency as well as for a broad region of very low frequencies the total resistance in the circuit with negative resistance can be adjusted to zero or almost to zero.

The "definite high frequency" is to be understood to mean the frequency of the carrying wave in telephony reception or that of the received oscillation in telegraphy reception.

A "broad region of very low frequencies" is to be understood to mean the region of the audible frequencies and lower frequencies.

The dependency of the impedance on the frequencies may arise from the presence of an oscillation circuit which is tuned to the high frequency. A "separate circuit" is to be understood to mean a circuit which is coupled with another circuit neither inductively nor capacitively nor by means of an ohmic resistance.

In the connections hitherto used, the total resistance has been adjusted to zero for the oscillations of high frequency. If, according to the invention, this is also done for the oscillation of low frequency, the currents of low frequency are also enabled to develop better.

According to the invention, the circuit which is mounted in series with the negative resistance may include an oscillation circuit which can be tuned to the high frequency and consists of a capacity and an inductance mounted in parallel, while there is arranged in series with the said oscillation circuit an ohmic resistance which can be made equal or almost equal to the negative resistance and to which a condenser is connected in parallel.

Instead of only the condenser shunting the resistance it is preferable to mount a condenser, and a resistance connected in series therewith as in Fig. 2, in parallel with the ohmic resistance which may be made substantially equal to the negative resistance, the two ohmic resistances being preferably practically free from selfinduction.

Some constructions of systems according to the invention are illustrated in Figures 2, 3 and 4 of the accompanying drawing, in which:

Figure 2 illustrates a system according to the invention with a circuit connected in series to a negative resistance between the points P and Q, which negative resistance may be obtained in any given manner.

Figure 3 represents an installation in which the invention is applied to a discharge tube comprising an incandescent cathode, an anode, a controlling grid, and an auxiliary grid which is located between the cathode and the controlling grid and has a positive potential relatively to the cathode.

Figure 4 shows another construction of a system according to the invention in which the negative resistance is obtained, for example, by means of an arc discharge.

In the system shown in Figure 2 the negative resistance occurs between the points P and Q. In series with this negative resistance there are mounted an oscillation circuit, consisting of an inductance 10 to which a capacity 11 is connected in parallel, and an ohmic resistance 12 to which a capacity 13 in series with an ohmic resistance 14 is connected in parallel. A proper choice of the value of the resistances, capacitances, and inductances permits the total resistance in the circuit in this system to be adjusted to zero both for the high frequency to be received and at the same time for the very low audible frequencies.

The oscillation circuit 10—11 is tuned to the frequency of the oscillation of high frequency to be received which acts inductively on it. This oscillation circuit has, for the low frequencies with which the high frequencies are modulated, a resistance which can practically be neglected. If the condenser 13 has a comparatively slight capacity, the resistance of the circuit 12—13—14—for the oscillations of low frequency is practically equal to the ohmic resistance 12 and the total resistance in the circuit for the oscillations of low frequency can consequently be made equal to zero if care is taken so that the resistance 12 is equal to the absolute value of the negative resistance between the points P and Q.

For the oscillations of high frequency to which the circuit 10—11 is tuned, the ohmic resistance of this circuit between the points A and B is equal to:

$$\frac{L}{rC}$$

if L=the inductance of the coil 10, C=the capacity of the condenser 11, and $r$=the slight ohmic resistance which practically always occurs in the oscillation circuit. This is derived as follows: let $z$=the impedance in ohms of the circuit 10, 11; let $j=\sqrt{-1}$ and let $\omega=2\pi$ times the frequency of the current in the circuit. The ohmic resistance $r$ of the circuit is small and may be assumed to be in series with the inductance L for radio frequencies. The total impedance $z$ will equal the product of the impedances of each of the two parallel sides divided by the sum of the impedances of each side; thus $$z = \frac{(r+j\omega L)\left(\frac{-j}{\omega C}\right)}{(r+j\omega L)+\left(\frac{-j}{\omega C}\right)} = \frac{\frac{L}{C}-j\left(\frac{r}{\omega C}\right)}{r+j\left(\omega L - \frac{1}{\omega C}\right)}$$

For resonance $\omega L$ must equal $$\frac{1}{\omega C}.$$

Therefore, at resonance $$\omega L - \frac{1}{\omega C} = 0.$$

Substituting in the equation for $z$:

$$z = \frac{\frac{L}{C} - \frac{jr}{\omega C}}{r} = \frac{L}{rC} - \frac{j}{\omega C}$$

The last member of the equation, $$\frac{j}{\omega C},$$

is so small relative to $$\frac{L}{rC}$$

that it may be neglected for all practical purposes. We therefore have:

$$z = \frac{L}{rC}$$

at resonance frequency of the circuit. For the oscillations of high frequency the ohmic resistance of the circuit 12—13—14 is less than the resistance 12, the impedance of the condenser 13 being of but small significance for the high frequency. It will be obvious, therefore, that by a proper choice of the value of the resistance 14 and of the capacity 13 the total resistance in the circuit can also be made equal to zero, for the oscillations of high frequency. Thus amplification of high frequency as well as of low frequency is consequently obtained with the aid of only one system with a negative resistance.

In using the installation shown in Figure 2, the resistances 12 and 14 are preferably free from induction. The resistance 14 is especially provided for the purpose of limiting the phase-displacement which for the oscillations of high frequency is caused by the presence of a condenser 13. Good results may, however, likewise be obtained if only a condenser is connected in parallel with the resistance 12.

In Figure 3 there are arranged within an envelope 15 which for example is highly evacuated in some known manner, a cathode 16, an anode 19, and grids 23 and 24. The cathode 16 is heated to the required temperature with the aid of a battery 17 and a variable resistance 18.—The anode 19 is connected to the cathode with the interposition of a battery 20 and a telephone 21 to which a condenser 22 is connected in parallel. The controlling grid 23 and the auxiliary grid 24 are connected to each other with the interposition of a grid condenser 25, a leakage resistance 26 being also provided. The two grids are further electrically connected to the battery 20 through an oscillation circuit 27—28 and through a variable ohmic resistance 29 to which a condenser 30 is connected in parallel. The auxiliary grid 24 has consequently about the same potential relatively to the cathode as the anode 19.

In such an installation there occurs a negative resistance in the circuit which is common to the two grids; so, for example, between the points P and Q measured through the discharge tube.

This phenomenon is due to the fact that the influence of the controlling grid on the current flowing in the circuit of the auxiliary grid is in general greater than the influence of the auxiliary grid itself, so that a rise of the potential in P, the potential in Q remaining constant, will cause a decrease of the grid current.

The circuit between the points P and Q allows the total resistance in the circuit in which the negative resistance occurs, to be adjusted to zero for the high carrier frequency as well as for the low audible frequencies. The modulated oscillations received by an antenna 31 are consequently not only amplified so far as the high carrier frequency is concerned but the oscillations of low frequency occurring at the grid condenser, owing to the detection, are also amplified in a considerable measure. As the current in the anode circuit varies in practically the same measure as the current in the circuit of the auxiliary grid 24, signals of low frequency, being considerably amplified, are consequently to be perceived in the telephone 21.

The arrangement of the circuit between the points P and Q corresponds, in principle to that shown in Figure 2; it must be observed however that the members 27, 28, 29, and 30 are illustrated as being variable which of course is desirable in practice, and that the resistance 14 is omitted.

In the system shown in Figure 4 there must be imagined between the points P and Q a negative resistance such as may occur, for example, in an arc discharge and which consequently has a magnitude of several ohms.

In this case the circuit includes an inductance 37 and a capacity 36 which are connected in series to each other and which are so tuned to the high frequency to be received that for this frequency $w$, $$L = \frac{1}{wC}.$$

From the impedance of 36 and 37 there remains for this frequency only the slight ohmic resistance which is practically always present and which is indicated in the figure by the reference numeral 32.

A leakage resistance 33 is mounted in parallel to the condenser 36, while the negative resistance between P and Q is bridged by an inductance 34 having a very high value for the high frequency, and by a resistance 35 which should be substantially equal to the absolute value of the negative resistance. For the oscillation of high frequency the circuit 34—35, mounted in parallel to the negative resistance, may be left without consideration, and by a proper choice of the leakage resistance 33 the total resistance in the circuit may be adjusted to zero.

For the oscillations of low frequency the total resistance in the circuit is approximately equal to $$r_{32} + r_{33} + \frac{r_{35} \times r_{neg}}{r_{35} - r_{neg}}$$

in which $r_{33}$ is much greater than $r_{32}$, and $r_{neg}$ = the absolute value of the negative resistance. In this case the total resistance can be adjusted to zero by causing $r_{35}$ to be a little less than $r_{neg}$.

It will be obvious that for practical use there should be put in the circuit a source of direct current and a telephone, which for the sake of clearness are omitted in Figure 4.

Let Z equal the impedance of the circuit 12, 13, and 14, and let $z$ equal the impedance of the circuit 10, 11. It will be seen that Z will be very small for any radio frequency currents passing through the circuit 10, 11, whereas it will be very large for any audio frequency currents passing through it on account of the inductance 10. On the other hand $z$ will be very small for any audio frequency currents passing through the circuit 12, 13, and 14 because of the easy path through the resistance 12, while the impedance will be very large for any radio frequency currents. If a radio frequency oscillation is impressed across the terminals PQ the total impedance of both circuits will be equal to the negative resistance obtained plus the impedance of the circuit 10, 11 which we found to be $$\frac{L}{rC}$$

plus the impedance of the circuit 12, 13, and 14 (which will be quite negligible on account of the small resistance 14). Therefore the total impedance will equal the negative resistance plus $$\frac{L}{rC}.$$

If $$\frac{L}{rC}$$

is made equal numerically to the negative resistance, than the total impedance will be very small and the current in the circuit will be at a maximum. At the same time on account of the high impedance $$\frac{L}{rC}$$

in the circuit 10, 11 (which is equal numerically to the negative resistance), the voltage or IR drop in this portion of the circuit 10, 11, will be very high. We can therefore say that for a definite high frequency oscillation the impressed signal is amplified very greatly in the circuit 10, 11.

On the other hand when an audio frequency oscillation is impressed across the terminals PQ the total impedance of the whole circuit will be the negative resistance plus the impedance in the circuit 10, 11 (which on account of the inductance 10 will be almost negligible for audio frequency currents) plus the impedance of the circuit 12, 13, and 14 (which must be equal to or less than the resistance 12). The total impedance, therefore, equals the negative resistance of the circuit plus the resistance 12, approximately. The current in the circuit will therefore be quite large because the resistance of 12 will be added algebraically to the negative resistance of the circuit. The voltage or IR drop in the circuit 12, 13, and 14 will consequently be very large.

This arrangement therefore results in a very small total impedance for one definite high frequency as well as for a broad range of low frequencies with a resultant amplification of signals received on those frequencies. In such an arrangement the high frequency carrier wave may be amplified and detected, and the audio oscillations sent through the same circuit for amplification.

What I claim is:

1. A receiving system for wireless telegraphy or telephony, containing a device having a negative resistance characteristic, and a circuit in series with that portion of the system which has the negative resistance, said circuit having an impedance of such value that the total resistance in the system can be adjusted substantially to zero for one definite high frequency and for a broad region of low frequencies.

2. A system according to claim 1, in which the circuit connected in series with the negative resistance includes an oscillation circuit which is tuned to the high frequency and comprises a capacity and an inductance connected in parallel, an ohmic resistance connected in series with the oscillation circuit, and a condenser connected in parallel with said ohmic resistance.

3. A system according to claim 1, in which the circuit connected in series with the negative resistance includes an oscillation circuit which is tuned to the high frequency and comprises a capacity and an inductance connected in parallel, an ohmic resistance connected in series with the said oscillation circuit, and a condenser in series with a second ohmic resistance connected in parallel with the first ohmic resistance.

4. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency.

5. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, said impedance having a resistive value which is commensurate with the magnitude of said negative resistance.

6. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, said impedance comprising a resistor having a magnitude substantially equal to the magnitude of said negative resistance.

7. In a combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, said impedance comprising a resistor and a capacity in shunt therewith.

8. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, said impedance comprising a resistor, and an aperiodic reactive path in shunt therewith.

9. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, said impedance comprising an adjustable aperiodic, reactive path connected in series between said anode and said oscillatory circuit.

10. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, the grid circuit of said tube being arranged for grid detection of said modulated energy, and means in said output circuit for utilizing the detected energy.

11. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, said oscillatory circuit and impedance being connected between said anode and said auxiliary electrode.

12. In combination in a circuit including a space discharge tube provided with a cathode, anode, grid and auxiliary electrode, means for maintaining the electrode positive with respect to the cathode whereby a negative resistance characteristic is imparted to the output circuit of the tube, a source of modulated high frequency energy coupled to the grid, an oscillatory circuit connected to the auxiliary electrode and resonant to said high frequency, and an impedance connected to said oscillatory circuit of such a magnitude that the total resistance of said output circuit is substantially zero both for said high frequency and the modulation frequency, means for positively biasing said anode with respect to the cathode, said oscillatory circuit and said impedance being connected in series between said anode and said auxiliary electrode.

13. In an electrical system, a source of modulated, high frequency energy, a detector having a negative resistance characteristic, and a path connected between the input and output circuits of the detector comprising an oscillatory circuit resonant to the high frequency and an impedance of such a magnitude that the total resistance of the output circuit is substantially zero both for said high frequency and the modulation frequency.

14. An electrical transmission system for modulated high frequency energy comprising a source of said energy, a device connected to said source having a negative resistance characteristic, and a path connected with said source and device comprising an oscillatory circuit resonant to said high frequency, and impedance of such a magnitude that the total resistance of said path is substantially zero, both for said high frequency and the modulation frequency.

15. In a radio receiver, an electron discharge tube provided with a cathode, an anode, and a pair of grids disposed between said anode and cathode, means for impressing signal energy between the cathode and both of said grids, said means including an inductance coil having one of its terminals connected to both of said grids, and connections, including means for maintaining the anode positive with respect to the cathode, between the other terminal of said coil and the cathode and anode, whereby said signal energy is impressed only between the grids and the cathode and not between the anode and cathode.

16. In a radio receiver, an electron discharge tube provided with a cathode, an anode, and a pair of grids, means for impressing signal energy between the cathode and both of said grids, said means including an inductance coil having one of its terminals connected to both of said grids, and connections, including means for maintaining the anode positive with respect to the cathode, between the other terminal of said coil and the cathode and anode, whereby said signal energy is impressed only between the grids and the cathode and not between the anode and cathode, at least one of said grids being normally at cathode direct current potential.

In testimony whereof I affix my signature, at the city of Eindhoven, this 19th day of December, A. D. 1924.

BALTHASAR van der POL.